(No Model.)
G. O. HOUCK.
CORN HARVESTER.
No. 573,270. Patented Dec. 15, 1896.
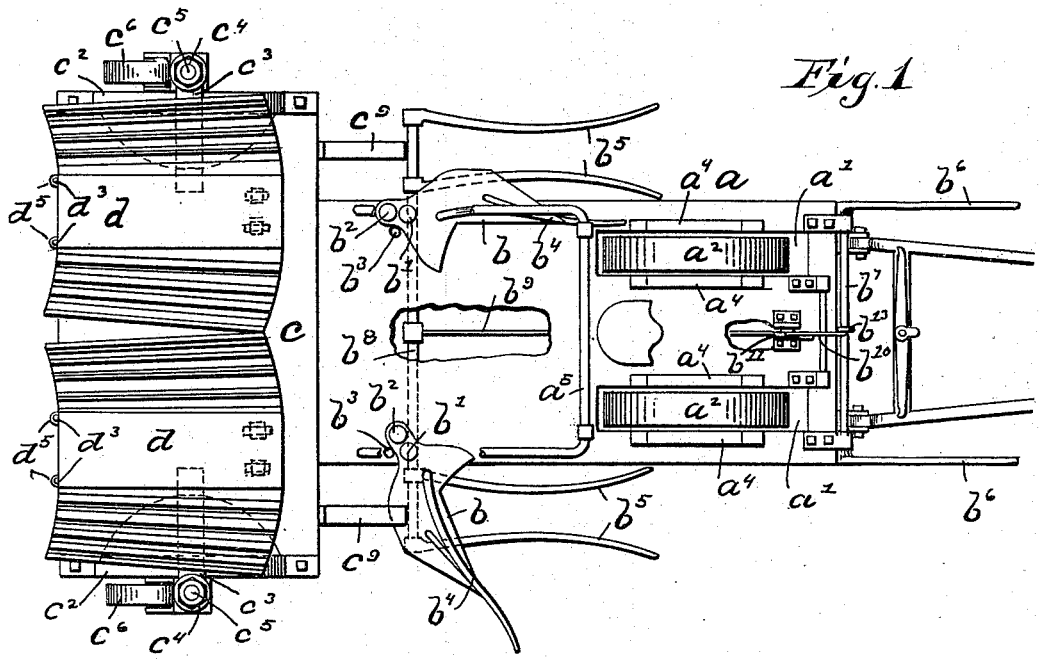
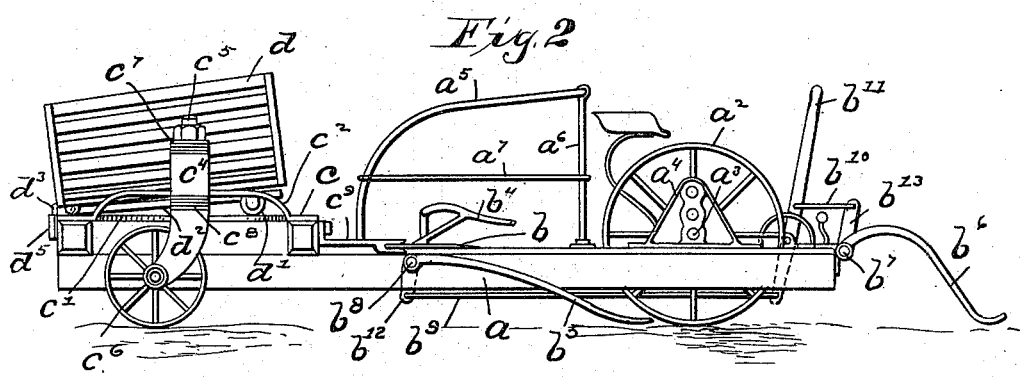
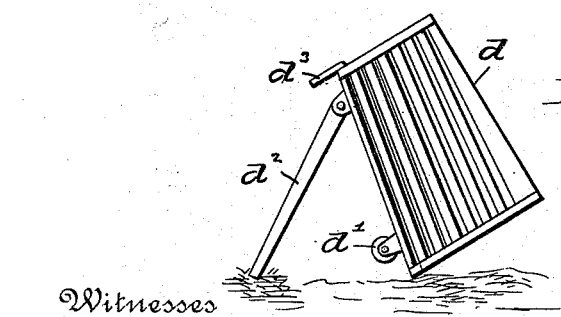
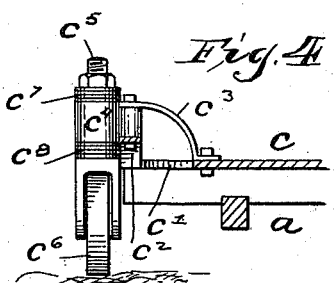
Witnesses
J. M. Gridley
Chas. J. Welch
Inventor
George O. Houck
By his Attorney

UNITED STATES PATENT OFFICE.

GEORGE O. HOUCK, OF SPRINGFIELD, OHIO, ASSIGNOR OF ONE-HALF TO WILLIAM H. HOUCK, OF SAME PLACE.

CORN-HARVESTER.

SPECIFICATION forming part of Letters Patent No. 573,270, dated December 15, 1896.

Application filed December 28, 1895. Serial No. 573,583. (No model.)

*To all whom it may concern:*

Be it known that I, GEORGE O. HOUCK, a citizen of the United States, residing at Springfield, in the county of Clark and State of Ohio, have invented certain new and useful Improvements in Corn-Harvesters, of which the following is a specification.

My invention relates to improvements in corn-harvesters, and it especially relates to that class of corn-harvesters shown and described in Patent No. 552,290, granted to William H. Houck and myself December 31, 1895.

The objects of my invention are to improve and simplify the constructions of corn-harvesters of this class and to provide, among other things, means for readily gathering and cutting the corn, arranging it in proper shape for shocking, and forming the same into shocks without an unnecessary amount of handling. I attain these objects by the constructions shown in the accompanying drawings, in which—

Figure 1 is a plan view, with some of the parts broken away, of my improved corn-harvester. Fig. 2 is a side elevation of the same, and Fig. 3 a detail view of the gathering and shocking frames. Fig. 4 is a detail of one of the supporting and gathering wheels.

Like parts are represented by similar letters of reference in the several views.

In the said drawings, $a$ represents the main frame, having formed therein at or near the front openings $a'$, in which are located supporting-wheels $a^2$, supported on suitable shafts or axles $a^3$, which are adjustable in bearing-supports $a^4$. Back of the supporting-wheels $a^2$ is a guard-rail $a^5$, supported on suitable standards $a^6$ and by stays $a^7$ to form a support and protection for the operators. The cutting-knives $b$ are pivoted at $b'$ in the manner described in said prior application and adapted to be held in different positions of adjustment by pins $b^2$, which may be inserted in the different openings $b^3$ in the platform to hold the knives in different angular positions or close them up when not in use, as illustrated at the top of Fig. 1. These knives are provided with guards $b^4$, which project above the same, as in said former application.

To provide for picking up and raising "down" corn, so as to be brought into contact with the knives, I employ at each side of the machine, preferably directly under and extending forward of the knives $b^4$, curved extending fingers $b^5$, which extend downwardly, thence outwardly, so as to bear on or rest in proximity to the ground on each side of the stalk-rows, so that as the machine advances the fingers are insinuated under any fallen stalks and raise the same to be severed by the knives. These fingers are further supplemented by similar fingers $b^6$ on a transverse shaft $b^7$ at the front of the frame, the fingers $b^5$ being also supported on a shaft $b^8$, which extends across the frame, preferably below and slightly in the rear of the cutting edge of the knives. The shafts $b^7$ $b^8$ are connected by means of links $b^9$ $b^{10}$ to opposite sides of a hand-lever $b^{11}$, pivoted in the frame $a$ and having means for holding it in different positions of adjustment, the connections of the links $b^9$ $b^{10}$ being made to the shafts $b^7$ $b^8$, respectively, through the intervention of projecting arms $b^{12}$ $b^{13}$, so that as said hand-lever is moved in either direction the respective fingers $b^5$ $b^6$ are raised or lowered simultaneously, means being thus provided for controlling the position of said fingers by the driver, whose seat is located in proximity to said hand-lever.

On the rear of the frame $a$ is an auxiliary table or frame $c$, which is raised slightly above the main frame or platform $a$ and is extended laterally, so as to project outwardly on each side beyond the cutting-knives. This auxiliary frame or table $c$, which is rigidly secured to the main frame $a$ and forms substantially a part thereof, is provided at each side with semicircular openings or recesses $c'$, over which there extend arched supports $c^2$ $c^3$, each connected to and supporting a bearing $c^4$, in which is journaled the stem $c^5$ of a caster-wheel $c^6$. This stem $c^5$ is provided on each side of the journal $c^4$ with a series of washers $c^7$ $c^8$, which may be changed from one side to the other of said bearing and thus furnish means for raising and lowering the frame on said caster-wheels. The arched supports and journals, in connection with the recessed openings $c'$ in the auxiliary table, permit these caster-wheels to turn completely around in their bearings, and being arranged at the outside of the extended portions of the table and beyond the cutting-knives they furnish means for supporting the frame rigidly, at the same time permitting it to turn in the smallest compass possible, the wheels $a^2$, as well as the caster-wheels, being journaled independently to permit more freedom in turning. The table $c$ is further preferably provided with forwardly-projecting arms $c^9$, which are bifurcated at their front ends to receive the backs of and form an additional support for the knives $b$ when turned to their operative position, as shown in Figs. 1 and 2. Arranged on this auxiliary frame or table $c$ are gathering and shocking frames $d$, which are preferably semicircular in form and may be slightly larger at one end than at the other, the enlarged ends being adapted to receive the butts and the smaller ends the tops of the corn, and thus shape it to form a bundle or shock. These frames are each preferably provided at one side and near one end with small supporting-rollers $d'$ and at or near the opposite end with a hinged leg or brace $d^2$. Small projections $d^3$, which may answer the purpose of handles in handling the said frames, are adapted, when the said frames are in position on the auxiliary table, to fit in sockets $d^5$ on said table and thus hold the frames in proper position.

The operation of the machine is as follows: In the normal position the gathering and shocking frames are placed on the auxiliary table $c$, so as to rest on the rollers $d'$ at one end, with the projections $d^3$ arranged within the sockets $d^5$ and the braces $d^2$ folded, the braces being held in a folded position by any suitable device. As the machine is drawn forward the stalks are severed by the cutting-knives, any down stalks being directed thereto by the fingers $b^5$ and $b^6$. The operators, standing behind the guard $a^5$, gather the incoming stalks and place them in the gathering and shocking frames $d$. When a sufficient quantity has been collected in said frames to form a shock, the machine is stopped. The operators disengage the respective frames by removing the projections $d^3$ from the sockets $d^5$ and draw the frames backwardly from the table $c$, the frames being adapted to travel on the rollers $d'$. Each frame is raised to the position shown in Fig. 3 and supported by the brace $d^2$, after which one operator takes one frame and the other operator the other frame and closes them together in a substantially vertical position, thus bringing the two bundles of corn into one in an upright position and into position to form a shock. The shock is then compressed and tied, the frames replaced, and the operation continued.

It will be seen from the above description that a machine is provided which is extremely simple in its construction and effective in its operation, the work of cutting, gathering, and shocking the corn being carried out in an effective manner.

The arrangement of the auxiliary platform, which stands above the main platform and projects outwardly beyond the knives, with the caster-wheels supporting the same, is such that the draft of the machine is materially lessened and the facilities for turning improved. At the same time the auxiliary table and the caster-wheel supports are permitted to pass over the stubble without engaging the same.

Having thus described my invention, I claim—

1. The combination with a main frame formed substantially rectangular and supported at the front by two independent carrying-wheels located within the lines of said frame, hinged cutting-knives adapted to extend laterally from opposite sides of said frame, and an auxiliary table or frame arranged above and extending across the main frame, caster-wheels supported at each end of said auxiliary frame or table in bearings arranged above and central with said table, and recessed openings formed substantially on the arc of a circle from said bearings, bifurcated projections extending from said auxiliary table so as to engage and support said cutting-knives, and semicircular gathering-frames supported on said auxiliary table, substantially as specified.

2. A main frame or platform, and an auxiliary table on said main frame or platform, caster-wheels supporting said auxiliary frame or table at each side, and gathering-frames arranged on said auxiliary table, and hinged support for holding said gathering-frames in position, each of said frames consisting essentially of a semicircular frame adapted when placed together to form a shock, as described, substantially as specified.

3. The combination with the rectangular frame, as described, having the laterally-extending cutting-knives on opposite sides thereof, a transverse shaft arranged at the front of said frame and provided at each end with downwardly-extending curved fingers substantially on a line with the respective sides of said frame, a transverse shaft also arranged across said frame below and slightly to the rear of the cutting edge of said knives, and downwardly-extending curved fingers arranged in pairs supported on each end of said transverse shaft and extending forwardly therefrom at the side of said main frame, crank-arms on each of said shafts and a connecting-rod connecting said shafts together, and an operating-lever connected to one of said shafts whereby all of said fingers are adapted to be moved simultaneously, substantially as specified.

4. In a corn-harvester, the combination with a platform and cutting-knives, of semicircular gathering-frames arranged on said platform, each of said frames being provided with supporting-rollers and a hinged supporting-brace, substantially as specified.

5. The combination with the cutting devices and an auxiliary table or frame, semicircular gathering and shocking frames on said table, sockets on said table and projections on said frames adapted to engage in said sockets, said frames being further provided with rollers and braces, substantially as specified.

In testimony whereof I have hereunto set my hand this 19th day of December, A. D. 1895.

GEORGE O. HOUCK.

Witnesses:
JOHN L. PLUMMER,
CHAS. I. WELCH.